United States Patent
Hung et al.

(10) Patent No.: US 9,759,468 B2
(45) Date of Patent: Sep. 12, 2017

(54) SYSTEM FOR CONTROLLING OPERATION OF AN HVAC SYSTEM HAVING TANDEM COMPRESSORS

(71) Applicant: Lennox Industries Inc., Richardson, TX (US)

(72) Inventors: Der-Kai Hung, Dallas, TX (US); Harold Gene Havard, Jr., Carrollton, TX (US); Rosa Maria Leal, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 675 days.

(21) Appl. No.: 14/221,843

(22) Filed: Mar. 21, 2014

(65) Prior Publication Data
US 2015/0267952 A1    Sep. 24, 2015

(51) Int. Cl.
F25B 49/02    (2006.01)

(52) U.S. Cl.
CPC .......... *F25B 49/022* (2013.01); *F25B 49/027* (2013.01); *F25B 2400/075* (2013.01); *F25B 2600/0251* (2013.01); *F25B 2600/0271* (2013.01); *F25B 2600/111* (2013.01); *F25B 2600/23* (2013.01); *F25B 2700/195* (2013.01); *F25B 2700/1931* (2013.01); *F25B 2700/1933* (2013.01); *F25B 2700/21152* (2013.01); *Y02B 30/743* (2013.01)

(58) Field of Classification Search
CPC .................. F25B 49/022; F25B 49/027; F25B 2600/0251; F25B 2600/23; F25B 2400/075; F25B 2700/1931; F25B 2700/1933
See application file for complete search history.

(56) References Cited

U.S. PATENT DOCUMENTS

| | | | |
|---|---|---|---|
| 4,028,593 A | | 6/1977 | Newell |
| 4,084,406 A | | 4/1978 | Brenneman |
| 4,304,103 A | | 12/1981 | Hamrick et al. |
| 4,506,516 A | * | 3/1985 | Lord ............ F04B 49/02 219/486 |
| 4,555,910 A | * | 12/1985 | Sturges ............ B60H 1/3205 236/35 |
| 4,909,042 A | | 3/1990 | Proctor et al. |
| 4,932,220 A | | 6/1990 | Inoue |
| 5,050,397 A | | 9/1991 | Sugiyama et al. |
| 5,570,585 A | | 11/1996 | Vaynberg |
| 5,572,878 A | | 11/1996 | Kapoor |

(Continued)

FOREIGN PATENT DOCUMENTS

EP    0 325 163    1/1889
GB    2029513    9/1978

OTHER PUBLICATIONS

"Indoor Air Handlers with Compressors" MVS60-90-120-144 nad MVW60-0-120-144, MVS/MVW PDS rev. 3, 8 pages, Oct. 2011.

*Primary Examiner* — Jianying Atkisson
*Assistant Examiner* — Kun Kai Ma
(74) *Attorney, Agent, or Firm* — Baker Botts L.L.P.

(57) ABSTRACT

The present invention provides for a control system for operating a heating, ventilation, and air conditioning (HVAC) system. A controller operates compressors in tandem. In response to detection of a high pressure condition in refrigerant flowing through a high pressure side of the HVAC system, the controller operates the HVAC system with a first compressor on and a second compressor off.

18 Claims, 4 Drawing Sheets

(56) References Cited

U.S. PATENT DOCUMENTS

| | | | |
|---|---|---|---|
| 6,332,327 B1 | 12/2001 | Street et al. | |
| 7,028,491 B2 | 4/2006 | Horton | |
| 7,665,318 B2 | 2/2010 | Jung et al. | |
| 7,765,817 B2 | 8/2010 | Takegami et al. | |
| 2005/0188708 A1* | 9/2005 | Wills | F04C 18/16 62/175 |
| 2006/0174640 A1* | 8/2006 | Caskey | F25B 49/027 62/183 |
| 2006/0225445 A1* | 10/2006 | Lifson | F24F 3/153 62/175 |
| 2007/0022765 A1* | 2/2007 | Lifson | F25B 49/025 62/180 |
| 2008/0276637 A1* | 11/2008 | Lifson | F25B 49/025 62/228.4 |
| 2009/0084120 A1* | 4/2009 | Meier | B64F 1/362 62/129 |
| 2010/0186433 A1* | 7/2010 | Galante | F04C 18/0215 62/115 |
| 2010/0298982 A1* | 11/2010 | Chamorro | H01R 13/6456 700/276 |
| 2011/0030397 A1 | 2/2011 | Taras et al. | |
| 2011/0083454 A1* | 4/2011 | Kopko | F25B 49/027 62/115 |
| 2011/0314845 A1* | 12/2011 | Lifson | F25B 49/022 62/115 |
| 2012/0167602 A1* | 7/2012 | Taras | F25B 49/02 62/115 |

\* cited by examiner

SYSTEM FOR CONTROLLING OPERATION OF AN HVAC SYSTEM HAVING TANDEM COMPRESSORS

CROSS REFERENCED APPLICATIONS

This application relates to co-pending U.S. patent application Ser. No. 14/221,862, entitled SYSTEM FOR OPERATING AN HVAC SYSTEM HAVING TANDEM COMPRESSORS, filed Mar. 21, 2014, which is hereby incorporated by reference.

BACKGROUND OF THE INVENTION

Field of the Invention

The present invention relates to control systems used in heating, ventilation, and air conditioning (HVAC) systems and, more particularly, to a system for controlling operation of an HVAC system having a tandem compressor assembly.

In an HVAC system, an abnormal pressure of refrigerant flowing within the HVAC system is an indicator that the HVAC system is malfunctioning. The HVAC system is equipped with pressure switches that monitor the pressure of refrigerant for diagnostic purposes and to prevent damage to components of the HVAC system. In response to an abnormal pressure condition, a control system of the HVAC system shuts down the HVAC system to prevent damage to compressors and other components of the HVAC system. What is needed are improved systems, devices, and methods for maintaining the pressure of refrigerant flowing through an HVAC system within normal operating ranges.

SUMMARY

The present invention provides a system for operating an HVAC system with tandem compressors. In response to detection of a high pressure in the high pressure side of the HVAC system, a controller operates the HVAC system with a first compressor on and a second compressor off.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning well-known features and elements have been omitted inasmuch as such details are not considered necessary to obtain a complete understanding of the present invention, and are considered to be within the understanding of persons of ordinary skill in the relevant art.

HVAC System 1000

Figure 1:
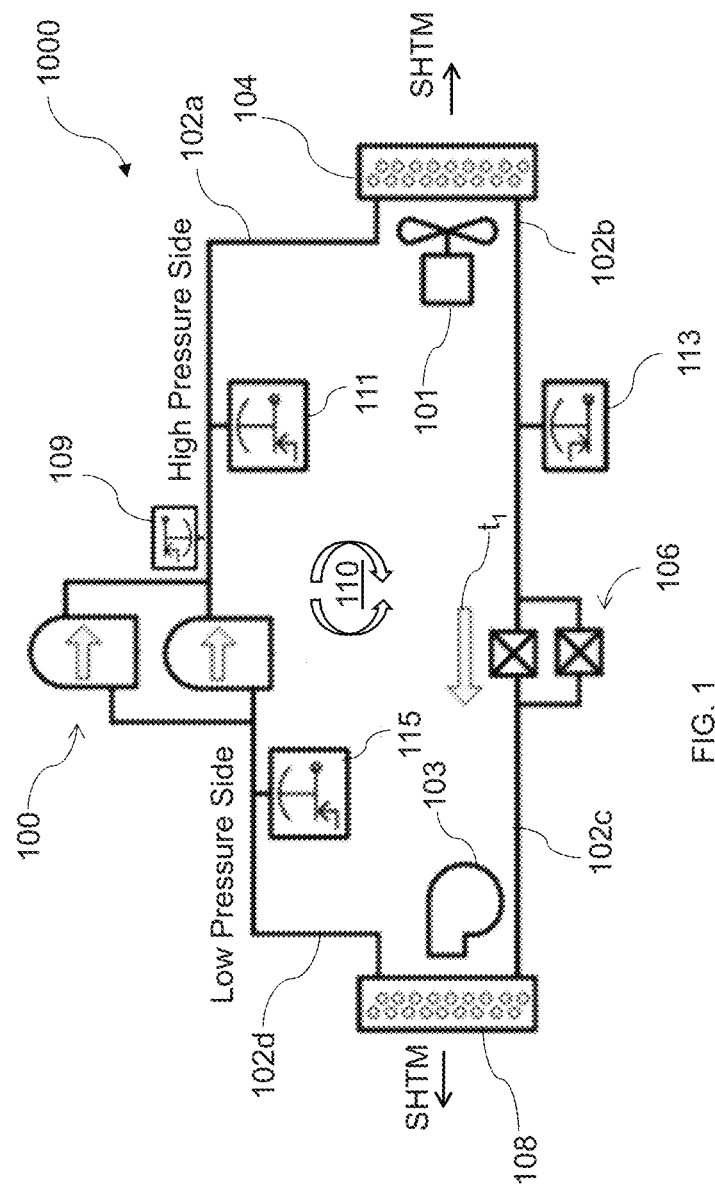
FIG. 1 illustrates an HVAC system having a tandem compressor assembly.

Referring to FIG. 1, a tandem compressor assembly 100 may be configured to operate in a heating, ventilation, and air conditioning (HVAC) system 1000. The tandem compressor assembly 100 may drive refrigerant, as a first heat transfer media, in direction $t_1$ through flow lines 102, which connect the tandem compressor assembly 100 to a condenser 104, to a thermal expansion device assembly 106, and to an evaporator 108. The flow lines 102 may return refrigerant back to the tandem compressor assembly 100 in a cooling or heating circuit 110, depending on the direction in which the refrigerant flows within the flow lines 102.

The HVAC system 1000 may utilize a second heat transfer media in the cooling and heating circuit 110. In some embodiments, the second heat transfer media (labeled "SHTM" in FIG. 1) is air. The HVAC system 1000 may be configured for refrigeration, cooling, and heating in the cooling or heating circuit 110 for maintaining a desired temperature profile in an enclosed space, such as a home or business.

Referring to FIG. 1, the HVAC system 1000 may comprise a high pressure side (i.e. between the compressor assembly 100 and the expansion valve assembly 106), where refrigerant is pumped up to a high pressure gas and forced to the condenser 104 by the tandem compressor assembly 100. The HVAC system 1000 may further comprise a low pressure side, where expansion of the refrigerant has lowered the pressure of the refrigerant (i.e. in a cooling circuit). The flow lines 102 may return low pressure substantially gaseous refrigerant to the compressor assembly 100, where the cooling cycle 110 is repeated.

Pressure Detection Assembly 130

Figure 3:
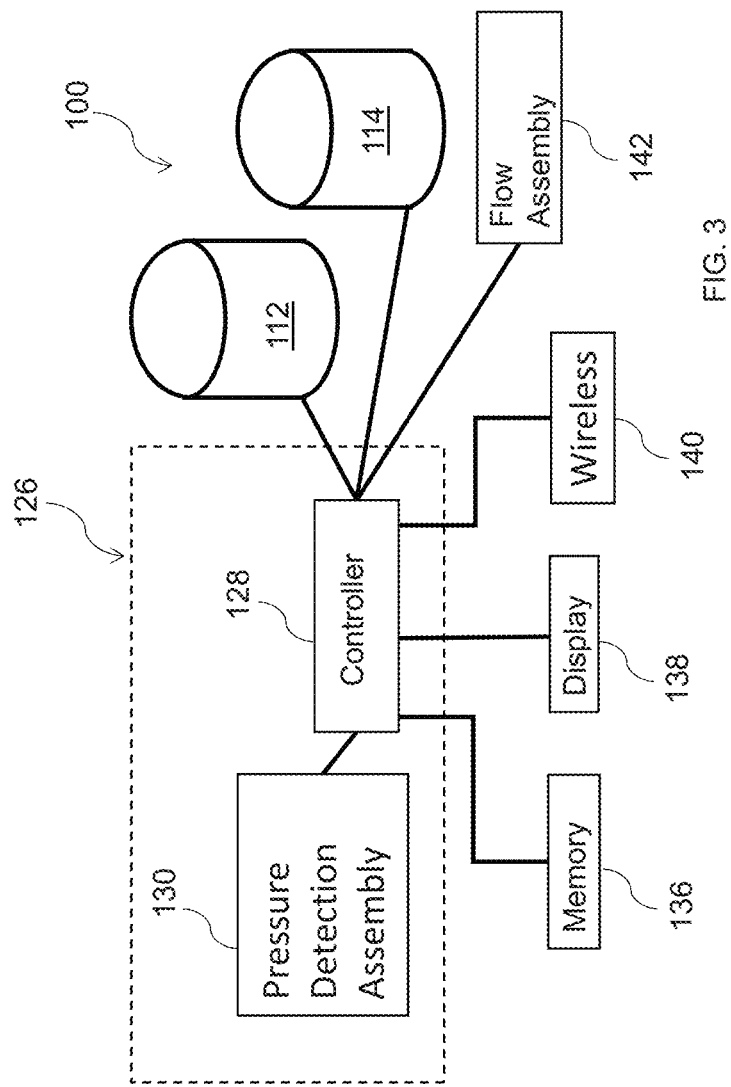
FIG. 3 shows a schematic of a control assembly operationally connected to a tandem compressor assembly.

Referring to FIGS. 1 and 3, a pressure detection assembly 130 may comprise a first pressure detection device 109 mounted on the high pressure side of the HVAC system 1000. The first pressure detection device 109 may be configured to detect an abnormal pressure condition in refrigerant flowing in the high pressure side of the HVAC system 1000.

The pressure detection assembly 130 may further comprise one or more pressure detection devices configured to detect the pressure of refrigerant in the flow lines 102a-d in one or more locations along the circuit 110. Referring to FIG. 1, a second pressure detection device 111 may be mounted on flow lines 102a between the tandem compressor assembly 100 and the condenser 104. The second pressure detection device 111 may be configured to detect a low pressure on the high pressure side of the HVAC system. A third pressure detection device 113 may be mounted on flow lines 102b between the condenser 104 and the expansion valve assembly 106. The third pressure detection device 113 may be configured to detect a high pressure in the flow lines 102b. A fourth pressure detection device 115 may be mounted on flow lines 102d between the evaporator 108 and the tandem compressor assembly 100. The fourth pressure detection device 115 may be configured to detect low pressure on the low pressure side of the cooling circuit 110.

The pressure detection devices 109, 111, 113, and 115 may each monitor and detect abnormal pressure conditions in the flow lines 102a-d. Each pressure detection device 109, 111, 113, and 115 may comprise a pressure switch. Each switch may change states, for example from closed to open, to generate a signal a control assembly 126 (shown in FIG.

3) indicating an abnormal pressure condition in the flow lines 102a-d. Each switch may be configured to detect the crossing of a threshold pressure—either a crossing from a low pressure to a high pressure or vice versa. In some embodiments, the pressure of refrigerant in the flow lines 102a-d is monitored by resetting an open switch of the pressure detection devices 109, 111, 113, and 115 to a closed state to determine if the switch closes or "trips" due to the pressure sensed by the pressure switch.

In other embodiments, the first pressure detection device 109 may comprise a high pressure transducer or a saturated temperature sensor or other detection device suitable for directly or indirectly sensing or measuring pressure in the HVAC system 1000.

Flow Assembly 142

Referring to FIGS. 1 and 3, a flow assembly 142 may comprise a first fluid moving device 101, such as a blower or fan, configured to move air, as the second heat transfer media, through the condenser 104, and a second fluid moving device 103, such as a blower or a fan, configured to move air through the evaporator 108. Each fluid moving device 101, 103 may comprise an adjustable speed for setting and changing the flow rate of the second heat transfer media.

Each fluid moving device 101, 103 may be configured to change the transfer of heat to refrigerant flowing in the HVAC system 1000. Changing the speed of the fluid moving devices 101, 103 may have a desired effect on operational parameters of the HVAC system 1000. For example, increasing the speed of the first fluid moving device 101 to change the rate of air flow over coils of the condenser 104 may tend to cool the refrigerant in the coils. This may have the overall effect of decreasing pressure of the refrigerant in the high pressure side of the HVAC system 1000.

In other embodiments, the HVAC system 1000 may utilize a different heat transfer media instead of air, for example water or other gas or fluid which transfers heat with refrigerant (or other heat transfer media) flowing in the evaporator 108 or condenser 104. In the case of the second heat transfer media being a fluid, the fluid moving devices 101, 103 used in FIG. 1 may comprise pumps configured to move fluid through the condenser 104 and evaporator 108.

Tandem Compressor Assembly 100

Figure 2:
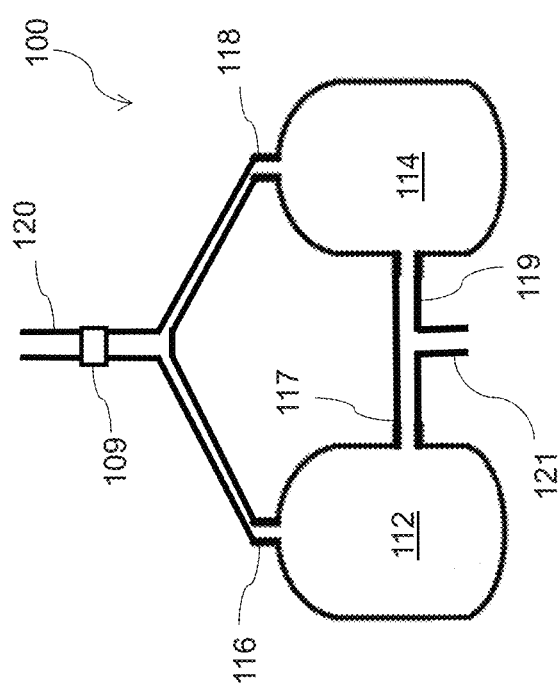
FIG. 2 shows a schematic of a tandem compressor assembly.

Referring to FIG. 2, the tandem compressor assembly 100 may comprise a first compressor 112 and a second compressor 114 operationally connected in tandem for adjustment of the total heat transfer capacity of the HVAC system 1000. It will be understood by persons of ordinary skill in the art that the tandem compressor assembly 100 may comprise two or more compressor units operated in tandem, for example a three compressor system.

The tandem compressor assembly 100 allows the first compressor 112 or the second compressor 114 to be operated while the other compressor 114 or 112, respectively, is turned off (referred to as a "one-compressor configuration") during periods of low heat transfer demand in a cooling circuit. The tandem compressor assembly 100 also allows both compressors 112 and 114 to be operated at the same time (referred to as a "two-compressor configuration") during periods of high heat transfer demand.

The tandem compressor assembly 100 may further be configured to operate in the one-compressor configuration in response to detection of an abnormal operating condition in the HVAC system 1000. For example, the tandem compressor assembly 100 may be operated in a one-compressor configuration in response to a detection of an abnormal pressure condition in the HVAC system 1000.

In some embodiments, one or more of the compressors 112, 114 in the tandem compressor assembly 100 may comprise a variable capacity, allowing for further adjustment of heat transfer by the HVAC system 1000 to meet the environmental demands. For example, the tandem compressor assembly 100 may be operated in a first stage "Y1" and a second stage "Y2," as referred to in FIG. 4. In the first stage Y1, the one or more of the compressors 112, 114 may be operated at reduced capacity to accommodate a lower heat transfer demand. In the second stage Y2, the one or more of the compressors 112, 114 may be operated at or near full capacity to accommodate a higher heat transfer demand.

Referring to FIGS. 1 and 2, the first compressor 112 and the second compressor 114 of the tandem compressor assembly 100 may share one or more portions of flow lines 102a-d in the same heating or cooling circuit 110. By example, a first discharge 116 line of the first compressor 112 and a second discharge line 118 of the second compressor 114 may be connected by a common discharge line 120. Refrigerant pumped from first compressor 112 and the second compressor 114 may flow from each respective discharge line 116, 118 into the common discharge line 120.

In some embodiments, the first pressure detection device 109 may be mounted on the common discharge line 120, as shown in FIG. 2, in a position to detect the discharge pressure of the tandem compressor assembly 100. In other embodiments, the first pressure detection device 109 may be mounted on other portions of the high pressure side, such as other portions of the flow lines 102a, b or as part of the tandem compressor assembly 100, the condenser 104, or the expansion valve assembly 106, which are shown in FIG. 1.

Referring to FIG. 2, a first suction line 117 and a second suction line 119 of the first compressor 112 and the second compressor 114, respectively, may be connected by a common suction line 121. It will be understood by persons of ordinary skill in the art that the first compressor 112 and the second compressor 114 may share other portions of the flow lines 102a-d in the circuit 110 shown in FIG. 1.

Control Assembly 126

Referring to FIG. 3, a control assembly 126 may be operationally connected to the tandem compressor assembly 100. The control assembly 126 may further comprise a controller 128 operationally connected to the tandem compressor assembly 100 configured to control operation of the of the tandem compressor assembly 100.

Referring to FIG. 3, the control assembly 126 may further comprise the controller 128 operationally connected to the pressure detection assembly 130 and the flow assembly 142. The pressure detection assembly 130 may be configured to detect an abnormal pressure condition of refrigerant in the HVAC system 1000, including in the flow lines 102a-d.

Referring to FIG. 1, the first pressure detection device 109 may be operationally connected to the flow lines 102a, b of the high pressure side to detect and monitor the pressure of refrigerant in the flow lines 102 a, b of the HVAC system 1000. The first pressure detection device 109 may allow the HVAC system 1000 to respond to an indication that the pressure in the high pressure side is approaching or exceeding normal operating conditions, which may indicate that the HVAC system 1000 is malfunctioning. In response to detection of an abnormal pressure condition, the control assembly 126 may be configured to operate the HVAC system 1000 to perform operations to extend the cooling period of the HVAC system 1000, including operating the HVAC system 1000 in a one-compressor configuration. The first pressure detection device 109 may also be utilized as a warning system to detect high pressure in the high pressure side of HVAC systems that operate with a single compressor.

The first pressure detection device 109 may comprise a first pressure threshold. This threshold may be set at a pressure indicative of an abnormally high pressure—a high pressure condition—in the high pressure side of the HVAC system 1000. For example, the first pressure threshold may be about 600 to 640 pound-force per square inch (psig) for a refrigerant R410A system. By comparison, the pressure in the high pressure side of the HVAC system 1000 may under normal operating conditions extend in the range of about 250 to 550 psig for a refrigerant R410A system. The first pressure detection device 109 may comprise a first pressure threshold. This threshold may be set at a pressure indicative of an abnormally high pressure—a high pressure condition—in the high pressure side of the HVAC system 1000. For example, the first pressure threshold may be about 600 to 640 pound-force per square inch (psig) for a refrigerant R410A system. By comparison, the pressure in the high pressure side of the HVAC system 1000 may under normal operating conditions extend in the range of about 250 to 550 psig for a refrigerant R410A system.

The first pressure threshold of the first pressure detection device 109 may be pre-selected, pre-programmed, or adjustable to accommodate response by the controller 128 to detection of an abnormal pressure condition in the HVAC system 1000. It will be understood by persons of ordinary skill in the art that the first pressure threshold may vary according to the operating conditions of the HVAC system 1000, for example as ambient conditions of the system increases or decreases.

Method 2000 for Controlling Operation of an HVAC System

Figure 4:
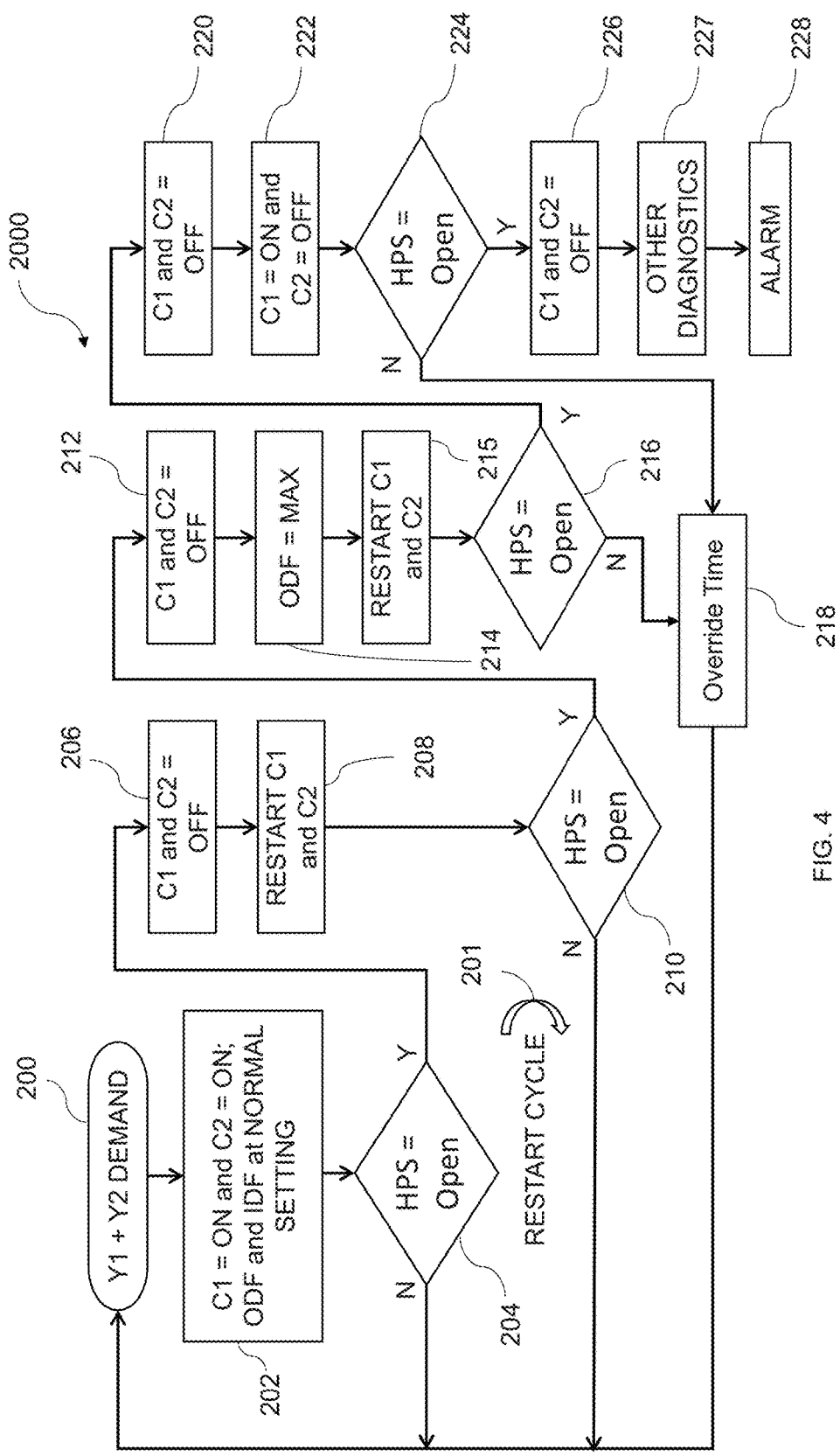
FIG. 4 shows a flow chart of operations of a method for controlling operation of an HVAC system.

Referring to FIG. 4, a method 2000 for controlling operation of an HVAC system having tandem compressors may comprise the HVAC system 1000 of FIGS. 1-3 configured to respond to detection of an abnormal pressure condition of refrigerant in the HVAC system 1000. The abnormal pressure condition may comprise an abnormally high pressure condition of refrigerant in the high pressure side of the HVAC system 1000 of FIG. 1.

In operation 200 of the method 2000 shown in FIG. 4, the HVAC system 1000 may operate at an initial operational state to meet a first demand. The operational state may comprise one or more operating conditions that describe and characterize how the HVAC system 1000 is working at any given time. For example, the operational state may comprise the capacities of the compressors 112, 114 and the speed of the fluid moving devices 101, 103, among other operating conditions of the HVAC system 1000.

The HVAC system 1000 may operate at a full capacity comprising the capacity of the first stage Y1 plus the second stage Y2, as shown in operation 200. In other embodiments, the initial operational state may comprise operation at a reduced capacity, for example, the capacity of the first stage Y1. It will be understood that this method 2000 may be implemented in HVAC systems that do not utilize multi-stage operation.

In operation 202, the first compressor 112 (referred to as "C1") and the second compressor 114 (referred to as "C2") may be operating jointly to meet the first demand of the initial state of the HVAC system 1000. The first fluid moving device 101, for example an outdoor fan ("ODF"), and the second fluid moving device 103, for example an indoor fan ("IDF") may be operating at a "NORMAL SETTING" configured to accommodate the first demand of the initial state. The NORMAL SETTING may comprise a speed setting for each fan IDF and ODF configured to meet the first demand in the initial operational state. The NORMAL SETTING of the ODF may further be configured to leave some of the capacity of the ODF in reserve, for example about 80% capacity of the maximum ("MAX") capacity.

Referring to FIG. 4, operation 204 may comprise the first pressure detection device 109, for example a high pressure detection device comprising a switch (labelled "HPS" in FIG. 4), detecting an abnormal pressure condition in the flow lines 102a-d of the HVAC system 1000. In some embodiments, the first pressure detection device 109 detects a high pressure condition in the high pressure side of the HVAC system 1000. A switch of the first pressure detection device 109 may change states, for example from closed to open, to generate a signal to the controller 128 indicating a high pressure condition in the refrigerant in the flow lines 102a, b, i.e. the high pressure side. In some embodiments, the pressure of refrigerant in the flow lines 102a, b is monitored by resetting an open switch of the HPS to a closed state to determine if the switch closes or "trips" due to the pressure sensed by the HPS.

In operation 204, the controller 128 may respond to detection of an abnormal pressure condition by initiating a restart cycle 201 to return the HVAC system 1000 to within the operating conditions of operations 200 and 202. The restart cycle 201 may comprise one or more adjustments of one or more operating conditions of the HVAC system 1000 configured to lower the pressure of the refrigerant in the high side of the HVAC system 1000 to prevent malfunction of the HVAC system 1000 or damage to components. The adjustments of the restart cycle 201 may allow the cooling period provided by the HVAC system 1000 to be extended by avoiding a complete or prolonged shutdown of the compressors 112, 114. If the HPS does not detect an abnormal pressure condition, then the controller 128 may continue to operate the HVAC system 1000 under normal operating conditions (e.g. operations 200 and 202).

In operations 206 and 208 shown in FIG. 4, the controller 128 may test the HVAC system 1000 to determine whether the indication of a high pressure by the HPS was a nuisance trip, and not likely caused by any malfunction of the HVAC system 1000. In operation 206, the controller 128 may shut off the compressors C1 and C2. The controller 128 may wait for a reset time period, e.g. about 5 (five) minutes, to allow the compressors and circuitry of the control assembly 126 time to reset. In operation 208, the controller 128 may restart both compressors C1 and C2 to test whether the HVAC system 1000 will operate at normal conditions.

In operation 210 shown in FIG. 4, the HPS may continue to monitor the pressure of refrigerant in the flow lines 102a, b for an abnormal pressure condition. The monitoring function of operation 210 may continue following the attempted restart of compressors C1 and C2 in operations 206 and 208, and may be utilized by the controller 128 as means to confirm that the restart of the compressors C1 and C2 resolved the high pressure condition detected in operation 204.

If the high pressure condition persists, the switch of the HPS may change states from closed to open position. In operation 210, the HPS may generate a signal to the controller 128 indicating a high pressure condition.

In operation 212 shown in FIG. 4, the controller 128 may shut down both compressors C1 and C2, in response to detection of a high pressure condition in operation 210. In operation 214, the controller 128 may adjust the rate of heat transfer between the refrigerant flowing in the HVAC system 1000 and the environment. For example, the controller 128 may modify the speed of the first fluid moving device 101, i.e. the ODF, to adjust the heat transfer from the condenser 104, shown in FIG. 1. In some embodiments, the speed of the ODF is increased above the NORMAL SETTING of the initial state to its MAX setting. The adjustment to the MAX setting of the ODF may result in a decrease in the pressure in the high pressure side of the HVAC system 1000. The adjustment of speed may be varied to accommodate the rate of heat transfer to the condenser 104 other environmental conditions, and demands on the HVAC system 1000.

Operations 212 and 214, shown in FIG. 4, may continue for an ODF time period configured to prepare the compressors C1 and C2 for restart in operation 215. In some embodiments, the ODF time period may equal about 5 minutes. It will be understood by persons of ordinary skill in the art that the ODF time period may be varied to accommodate the desired normal operating conditions, including taking into account environmental conditions and demands on the HVAC system 1000.

In operation 215, the controller 128 may restart both compressors C1 and C2 in an attempt to return the HVAC system 1000 to normal operating conditions, i.e. to complete the restart cycle 201. If the high pressure condition persists, the switch of the HPS may change states from closed to open position in operation 216. The HPS may generate a signal to the controller 128 indicating a high pressure condition.

In operation 216, the controller 128 may monitor the pressure condition of the refrigerant in the flow lines 102a, b. The controller 128 may receive a signal from the first pressure detection device 109 indicating that the pressure in the flow lines 102a, b is no longer in an abnormal condition. For example, the switch of the first pressure detection device 109 may return to a closed position or remain closed after a reset from the open position, indicating that the pressure is below the first pressure threshold. If the HPS remains closed in operation 216, the controller 128 may continue to operate HVAC system 1000 according to operation C1 and C2, i.e. in a two-compressor configuration, for an Override Time Period, in operation 218 to allow the HVAC system 1000 to operate the HVAC system 1000 under the current speed setting of the ODF and complete the restart cycle 201.

During the Override Time Period, the controller 128 may override the control logic employed to operate the HVAC system 1000. In other embodiments, the override time may be optional, and the controller 128 may, instead, operate the HVAC system 1000 under the current speed setting of the ODF until demand is satisfied.

In some embodiments, the Override Time Period is a preset time period configured to allow time for the pressure of the refrigerant in the high pressure side of the HVAC system 1000, and other operating conditions of the HVAC system 1000 to return to normal. In some embodiments, the Override Time Period may comprise about an hour. In other embodiments, the Override Time Period may be calculated by the controller 128 based on the known operational state of the HVAC system 1000, the demand on the HVAC system 1000, and other environmental conditions.

In operation 220 shown in FIG. 4, the controller 128 may shut down both compressors C1 and C2, in response to continued detection of a high pressure condition in operation 210. In operation 222, the controller 128 may operate the tandem compressor assembly in a one-compressor configuration with compressor C1 turned on and compressor C2 shut down in an off state (i.e. the first compressor 112 on and the second compressor 114 off, or vice versa in other embodiments). In some embodiments, the speed of ODF may be additionally set at the NORMAL SETTING. In other embodiments, the speed of the ODF may be adjusted from the NORMAL SETTING to meet demand requirements or to adjust heat exchange to respond to the high pressure condition.

Operation 222 may continue for a one-compressor time period. This one-compressor time period may be preset or calculated by the controller 128 to allow time for the refrigerant in the flow lines 102a, b to return to a normal pressure condition. The pressure in the high pressure side of the HVAC system 1000 may drop in response to operation of the system in a one-compressor configuration.

If the HPS remains closed in operation 224, the controller 128 may continue to operate HVAC system 1000 according to operation 222, i.e. in a one-compressor configuration, for the Override Time Period in operation 218, to complete the restart cycle 201.

The selection of which compressor 112, 114 to operate in the one-compressor configuration may depend on the capacity of the compressor 112 or 114 and the required demand on the HVAC system 1000. For example, one compressor may comprise a larger total capacity, which may be utilized to meet the demand on the HVAC system 1000, instead of the smaller capacity compressor.

Continued detection of a high pressure condition in the flow lines 102a, b by the first pressure detection device 109, in operation 224, may indicate that the actions taken in operation(s) 220 or 222 or both were not effective in preventing a high pressure condition in the flow lines 102a, b (e.g. an abnormally high discharge pressure). The controller 128, in operation 226 shown in FIG. 4, may respond to continued detection of a high pressure condition, for example, by shutting down both the first compressor 112 and the second compressor 114.

In operation 227 shown in FIG. 4, the controller 128 may execute other troubleshooting or diagnostic operations, such as cycling the first compressor 112 and the second compressor 114. The compressor that was operated in operation 222 (the "ON compressor") may be cycled by being shut down and then powered back on. The cycling of the ON compressor may allow the controller 128 to test whether the ON compressor is malfunctioning in operation 227. The controller 128 may receive other diagnostic data from the ON compressor to assist in evaluation of the operability of the ON compressor.

In response to a determination that the ON compressor is malfunctioning, the controller 128, in operation 227, may re-initiate operation 222 operating the HVAC system 1000 in a one-compressor configuration. The initial ON compressor (i.e. C1) may be shut down and the other compressor (i.e. C2) may be operated as the ON compressor in the one-compressor configuration. The same evaluation of the other compressor operated as the ON compressor may be executed to determine whether it is malfunctioning.

If there is a determination by the controller 128 that one or both compressors are malfunctioning or that the operations of the restart cycle 201 could not return the HVAC system 1000 to normal operating conditions, then an alarm may be generated, according to operation 228 shown in FIG. 4. Such alarms may be useful to users and diagnosticians in later troubleshooting the cause of the high pressure conditions.

The alarm of operation 228 may comprise an electronic communication. The communication may comprise a textual or visual summary of data regarding operation of the HVAC system 100, including a characterization of pressure of the refrigerant in the flow lines 102a, b, such as a chart, graph, or table. The communication may also include information regarding the operability of the compressors 112, 114, and any other information collected or calculated based on the operations of method 2000.

The communication may be sent to a display, stored in memory, or communicated directly to a third party. Referring to FIG. 3, the communication may be stored in a memory log 136 operationally connected to the controller 128. The pressure of refrigerant in the flow lines 102a,b may be sent to a display 138. For example, a diagnostician may be connected to a port (not shown) operationally connected to the controller 128 and may request a reading of the flow line pressure (e.g. discharge pressure), or may access the memory log 136 that contains a history of the flow line pressure for a given time period. In other embodiments, the communication, e.g. an alarm, generated by the controller 128 in operation 228 may be sent via a wireless device 140, for example as an email or text message.

The HVAC system 1000 may be operated in one or more restart cycles in response to detection of a high pressure condition in the flow lines 102a,b. In operation 224 shown in FIG. 4, for example, determination that the actions taken by the controller 128 in a first restart cycle 201 were not effective in preventing or resolving a high pressure condition in the high pressure side of the HVAC system 1000 may prompt the controller 128 to initiate a second restart cycle. The initiation of a second restart cycle may be instead of or in conjunction with the other diagnostics in operation 227 and the generation of an alarm in operation 228.

The second restart cycle may contain some or all of the operations of the first restart cycle 201 (e.g. shown in FIG. 4). In some embodiments, the controller 128 may begin the second restart cycle at either operation(s) 212 or 220, depending on the desired demand on the HVAC system 1000, environmental conditions, and the detected pressure of refrigerant in the flow lines 102a, b.

It will be understood by persons of ordinary skill in the art that the controller 128 may comprise one or more processors and other well-known components. The controller 128 may further comprise components operationally connected but located in separate in locations in the HVAC system 1000, including operationally connected by wireless communications. For example, the controller 128 may comprise a first controller unit located on an outside portion of the HVAC system (where the compressor and condenser may be), a second controller unit located on an inside portion (where the evaporator may be), a thermostat for monitoring environmental conditions (on a wall of an enclosed space), and a control unit accessible for user input (embodied on a hand-held wireless unit). The controller 128 may further comprise a timing function for measuring the time periods disclosed herein.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A control system for operating a heating, ventilation, and air conditioning (HVAC) system, the control system comprising:
a control assembly configured to operationally connect to a compressor assembly of the HVAC system, wherein the control assembly is configured to operate the HVAC system in at least a first operational state to meet a first demand on the HVAC system;
wherein the control assembly comprises a controller configured to control operation of a first compressor unit and a second compressor unit of the compressor assembly;
wherein the first compressor unit and the second compressor unit operate in tandem to pump a first heat transfer media through the HVAC system, and wherein the first compressor unit and the second compressor unit operate at a first capacity to maintain the HVAC system in the first operational state;
wherein the HVAC system comprises first flow lines for the flow of the first heat transfer media through a condenser between the compressor assembly and an expansion device, and wherein the first flow lines comprise a high pressure side of the HVAC system;
wherein the controller is configured to control operation of a first fluid moving device, wherein the first fluid moving device is configured to pass a second heat transfer media over coils of the condenser of the HVAC system to transfer heat from the first heat transfer media flowing through the coils of the condenser, and wherein the first fluid moving device comprises a first speed setting configured to maintain the HVAC system in the first operational state;
wherein the controller is configured to detect a high pressure condition in the high pressure side, and, in response to detection of the high pressure condition the controller operates the HVAC system in at least one restart cycle, wherein the at least one restart cycle comprises at least a first adjustment of an operating condition of the HVAC system, and wherein the first adjustment is selected from the following:
increasing the speed of the first fluid moving device from the first speed setting to a second speed setting, wherein the second speed setting is configured to adjust heat transfer to the high pressure side of the HVAC system to lower the pressure of the first heat transfer media in the first flow lines, and
operating the HVAC system with the first compressor on and the second compressor off; and
wherein the controller is configured to detect a normal pressure condition of the first heat transfer media in the first flow lines, and wherein the at least one restart cycle further comprises, in response to detection of the normal pressure condition, the controller operates the HVAC system according to the first adjustment for an override time period.

2. The control system of claim 1,
wherein the first adjustment further comprises shutting off the first compressor and the second compressor followed by increasing the speed of the first fluid moving device from the first speed setting to a second speed setting; and
wherein the first fluid moving device unit is operated at the second speed setting for a first time period, and wherein following completion of the first time period the first adjustment further comprises restarting the first compressor and the second compressor.

3. The control system of claim 1,
wherein the first adjustment further comprises shutting off the first compressor and the second compressor followed by operating the HVAC system with the first compressor on and the second compressor off; and
wherein the HVAC system is operated with the first compressor on and the second compressor off for a second time period.

4. The control system of claim 1,
wherein, in response to detection of a high pressure condition in the high pressure side of the HVAC system, the first adjustment comprises increasing the speed of the first fluid moving device from the first speed setting to the second speed setting followed by operating the HVAC system with the first compressor on and the second compressor off.

5. The control system of claim 1, wherein the at least one restart cycle further comprises:
a second adjustment of an operating condition of the HVAC system, the second adjustment comprising the controller detecting the high pressure condition in the high pressure side of the HVAC system, and, in response to detection of the high pressure condition, shutting off the first compressor and the second compressor followed by restarting the first compressor and the second compressor after a reset time period.

6. The control system of claim 5,
wherein, in response to detection of the high pressure condition in the high pressure side of the HVAC system, the first adjustment follows the second adjustment; and
wherein the first adjustment comprises increasing the speed of the first fluid moving device from the first speed setting to the second speed setting followed by operating the HVAC system with the first compressor on and the second compressor off, and wherein the HVAC system is operated with the first compressor on and the second compressor off for a second time period.

7. The control system of claim 1 further comprising:
a first pressure detection device mounted on the high pressure side of the HVAC system and, wherein the first pressure detection device is configured to detect the high pressure condition in the first flow lines of the high pressure side of the HVAC system; and
wherein the first pressure detection device generates a signal to the controller when the first pressure detection device detects a high pressure condition.

8. The control system of claim 7,
wherein the first pressure detection device is mounted on a common discharge line extending commonly from discharge line of the first compressor and the second compressor, respectively; and
wherein the first pressure detection device is configured to detect a discharge pressure of the compressor assembly.

9. The control system of claim 8,
wherein the first pressure detection device comprises a high pressure switch.

10. The control system of claim 1,
wherein the second speed setting of the first fluid moving device unit comprises a maximum speed capacity of the first fluid moving device.

11. A method for controlling operation of a heating, ventilation, and air conditioning (HVAC) system, the method comprising:
providing a control assembly configured to operationally connect to a compressor assembly and a first fluid moving device of the HVAC system, wherein the control assembly is configured to operate the HVAC system in at least a first operational state to meet a first demand on the HVAC system;
wherein the control assembly comprises a controller configured to control operation of a first compressor and a second compressor of the compressor assembly, wherein the first compressor and the second compressor operate in tandem to pump a first heat transfer media through the HVAC system, and wherein the first compressor and the second compressor operate at a first capacity to maintain the HVAC system in the first operational state;
wherein the HVAC system comprises first flow lines for the flow of the first heat transfer media through a condenser between the compressor assembly and an expansion device, and wherein the first flow lines comprise a high pressure side of the HVAC system;
wherein the controller is configured to control operation of the first fluid moving device, wherein the first fluid moving device is configured to pass a second heat transfer media over coils of the condenser of the HVAC system to transfer heat from the first heat transfer media flowing through the coils of the condenser, and wherein the first fluid moving device comprises a first speed setting configured to maintain the HVAC system in the first operational state; and
detecting, by the controller, a high pressure condition in the high pressure side;
operating, by the controller, the HVAC system in at least one restart cycle in response to the detection of the high pressure condition;
wherein a first restart cycle comprises at least a first adjustment of an operating condition of the HVAC system, the first adjustment selected from the following:
increasing the speed of the first fluid moving device from the first speed setting to a second speed setting, wherein the second speed setting is configured to adjust heat transfer to the high pressure side of the HVAC system to lower the pressure of the first heat transfer media in the first flow lines, and operating the HVAC system with the first compressor on and the second compressor off; and
wherein the first restart cycle further comprises:
detecting, by the controller, a normal pressure condition of the first heat transfer media in the first fluid moving device; and
in response to detection of a normal pressure condition, operating, by the controller, the HVAC system according to the first adjustment for an override time period.

12. The method of claim 11, further comprising:
wherein the first adjustment comprises shutting off, by the controller, the first compressor and the second compressor followed by increasing, by the controller, the speed of the first fluid moving device from the first speed setting to the second speed setting; and
wherein the controller operates the first fluid moving device at the second speed setting for a first time period, and wherein following completion of the first time period the first adjustment further comprises restarting, by the controller, the first compressor and the second compressor.

13. The method of claim 11,
wherein the first adjustment further comprises shutting off the first compressor and the second compressor, by the controller, followed by operating the HVAC system with the first compressor on and the second compressor off; and wherein the HVAC system is operated with the first compressor on and the second compressor off for a second time period.

14. The method of claim 11, wherein, in response to detection of the high pressure condition in the high pressure side of the HVAC system, the first adjustment comprises increasing the speed of the first fluid moving device from the first speed setting to the second speed setting followed by operating the HVAC system with the first compressor on and the second compressor off.

15. The method of claim 11, the first restart cycle further comprising:
a second adjustment of an operating condition of the HVAC system, the second adjustment comprising:
detecting, by the controller, the high pressure condition in the high pressure side of the HVAC system, and
in response to detection of the high pressure condition, shutting off, by the controller, the first compressor and the second compressor followed by restarting the first compressor and the second compressor after a reset time period.

16. The method of claim 15, wherein, in response to detection of the high pressure condition in the high pressure side of the HVAC system, the first adjustment follows the second adjustment; and
wherein the first adjustment comprises increasing the speed of the first fluid moving device from the first speed setting to the second speed setting followed by operating the HVAC system with the first compressor on and the second compressor off, and wherein the HVAC system is operated with the first compressor on and the second compressor off for a second time period.

17. The control system of claim 16, the first restart cycle comprising:
wherein following expiration of the second time period and in response to a continued detection of the high pressure condition in the high pressure side, generating, by the controller, an alarm signal.

18. A control system for operating a heating, ventilation, and air conditioning (HVAC) system, the control system comprising:
a control assembly configured to operationally connect to a compressor assembly of the HVAC system, wherein the control assembly is configured to operate the HVAC system in at least a first operational state to meet a first demand on the HVAC system;
wherein the control assembly comprises a controller configured to control operation of a first compressor and a second compressor of the compressor assembly, wherein the first compressor and the second compressor operate in tandem to pump a first heat transfer media through the HVAC system, and wherein the first compressor and the second compressor operate at a first capacity to maintain the HVAC system in the first operational state;
wherein the controller is configured to detect a high pressure condition in a high pressure side of the HVAC system, the high pressure side of the HVAC system comprising first flow lines for the flow of the first heat transfer media through a condenser between the compressor assembly and an expansion device, and, in response to detection of the high pressure condition the controller operates the HVAC system in at least one restart cycle, wherein the at least one restart cycle comprises at least a first adjustment of an operating condition of the HVAC system, and wherein the first adjustment is selected from the following:
increasing the speed with which a fluid moving device flows a second heat transfer media over at least a portion of the condenser of the HVAC system, wherein increasing the speed of the second heat transfer media adjusts heat transfer to the high pressure side of the HVAC system to lower the pressure of the first heat transfer media, and
operating the HVAC system with the first compressor on and the second compressor off; and
wherein, after detecting the high pressure condition, the controller is configured to detect a return to a normal pressure condition of the first heat transfer media in the first flow lines, and in response to detection of the return to the normal pressure condition, the controller operates the HVAC system with the first compressor on and the second compressor off for an override time period and operates the HVAC system according to normal operating conditions after the override time period has elapsed.

* * * * *